United States Patent
Brunet et al.

(10) Patent No.: US 7,166,850 B2
(45) Date of Patent: Jan. 23, 2007

(54) FLUID MIXING DEVICE

(75) Inventors: Robert A. H. Brunet, Mt. Brydges (CA); Marc-Olivier Buffle, London (CA); Kuang-Ping Chiu, London (CA); Dongming Lu, London (CA); Fariborz Taghipour, London (CA)

(73) Assignee: Trojan Technologies Inc. (CA)

( * ) Notice: Subject to any disclaimer, the term of this patent is extended or adjusted under 35 U.S.C. 154(b) by 0 days.

(21) Appl. No.: 09/874,376

(22) Filed: Jun. 6, 2001

(65) Prior Publication Data

US 2002/0036951 A1    Mar. 28, 2002

Related U.S. Application Data

(60) Provisional application No. 60/209,597, filed on Jun. 6, 2000.

(51) Int. Cl.
*C02F 1/32* (2006.01)
(52) U.S. Cl. .................. 250/436; 250/438; 366/337
(58) Field of Classification Search ........ 366/336–339; 137/37, 38, 40, 42; 250/435–438
See application file for complete search history.

(56) References Cited

U.S. PATENT DOCUMENTS

| | | | |
|---|---|---|---|
| 846,751 A * | 3/1907 | Melvin | |
| 1,932,610 A * | 10/1933 | Tilley | |
| 3,212,992 A * | 10/1965 | Salesse et al. | |
| 3,923,288 A * | 12/1975 | King | |
| 4,258,782 A * | 3/1981 | Kao | |
| 4,482,809 A * | 11/1984 | Maarschalkerweerd | |
| 4,872,980 A * | 10/1989 | Maarschalkerweerd | |
| 5,006,244 A * | 4/1991 | Maarschalkerweerd | |
| 5,418,370 A | 5/1995 | Maarschalkerweed | 250/431 |
| 5,539,210 A * | 7/1996 | Maarschalkerweerd | |
| 5,614,723 A | 3/1997 | Oppenländer et al. | 250/435 |
| 5,696,380 A * | 12/1997 | Cooke et al. | |
| 5,758,967 A * | 6/1998 | King | |
| 5,813,762 A * | 9/1998 | Fleischli et al. | |
| 5,846,437 A * | 12/1998 | Whitby et al. | |
| 5,866,910 A * | 2/1999 | Cooke et al. | |
| 5,937,266 A | 8/1999 | Kadoya | 422/186.3 |
| 5,994,705 A * | 11/1999 | Cooke et al. | |
| 6,015,229 A | 1/2000 | Cormack et al. | 366/336 |
| 6,420,715 B1 * | 7/2002 | Cormack et al. | |

FOREIGN PATENT DOCUMENTS

| | | | |
|---|---|---|---|
| GB | 2 056 871 A | * | 3/1981 |
| WO | WO 99/13975 | * | 3/1999 |
| WO | WO 00/26144 | | 5/2000 |
| WO | WO 00/51943 | | 9/2000 |

OTHER PUBLICATIONS

Fishbane et al., "Physics for Scientics and Engineers", 1993, pp. 522-523.*

* cited by examiner

*Primary Examiner*—David Sorkin
(74) *Attorney, Agent, or Firm*—Katten Muchin Rosenman LLP

(57) ABSTRACT

A fluid mixing device comprising at least one mixing element specifically oriented with respect to the direction of fluid flow through the device. This novel orientation of the mixing element results in improved fluid mixing.

39 Claims, 11 Drawing Sheets

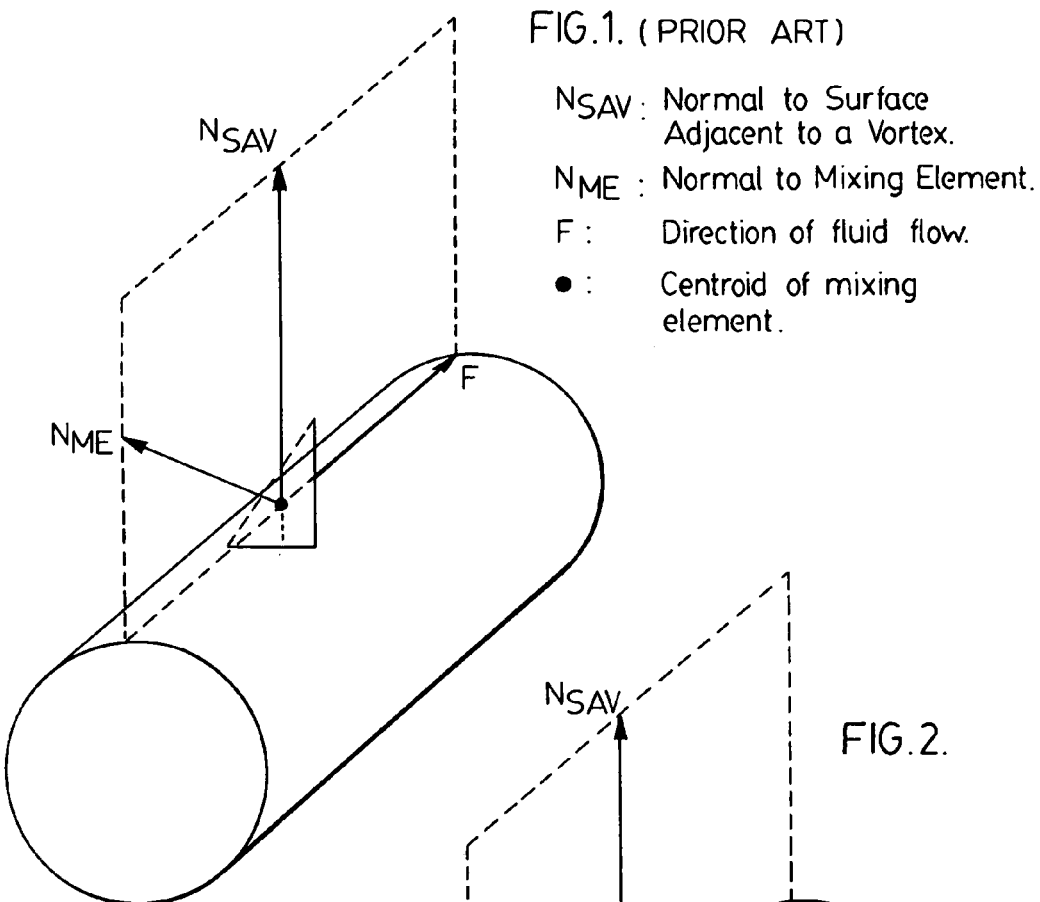
FIG.1. (PRIOR ART)
$N_{SAV}$ : Normal to Surface Adjacent to a Vortex.
$N_{ME}$ : Normal to Mixing Element.
F : Direction of fluid flow.
● : Centroid of mixing element.
FIG.2.
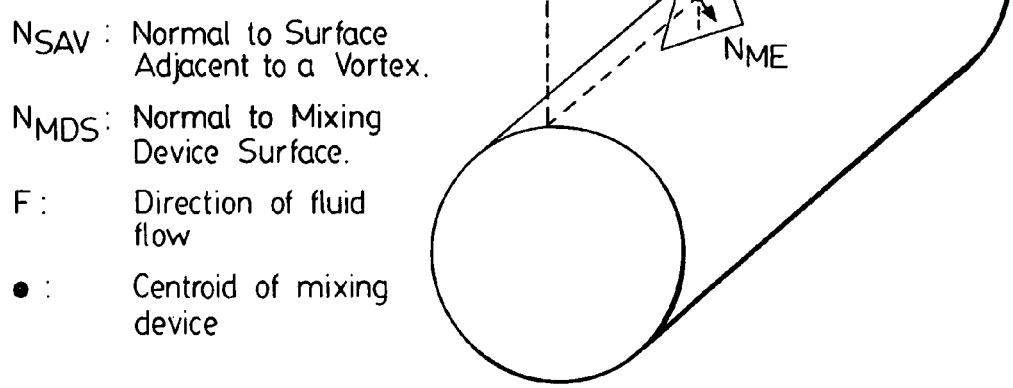
$N_{SAV}$ : Normal to Surface Adjacent to a Vortex.
$N_{MDS}$ : Normal to Mixing Device Surface.
F : Direction of fluid flow
● : Centroid of mixing device

FLUID MIXING DEVICE

CROSS-REFERENCE TO RELATED APPLICATION

The present application claims the benefit under 35 U.S.C. §119(e) of provisional patent application Ser. No. 60/209,597, filed Jun. 6, 2000, the contents of which are hereby incorporated by reference.

BACKGROUND OF THE INVENTION

1. Field of the Invention

In one of its aspects, the present invention relates to a fluid mixing device. In another of its aspects, the present invention relates to a method for mixing a fluid.

2. Description of the Prior Art

Mixing devices are known in the art and have been used to promote fluid turbulence—for example, to improve contact between elements in the flow path. Industrial applications of mixing are widely varied, and include heat exchange, reactor engineering and non-reactive blending.

One specific area of reactor engineering where mixing has been used is in the design of fluid treatment devices, particularly fluid radiation treatment devices. A specific such fluid radiation treatment device includes ultraviolet (UV) disinfection devices for water and wastewater treatment. The performance of UV disinfection devices depends, at least in part, on providing a prescribed dose of UV radiation to all fluid elements passing through (or otherwise being treated by) the device.

The UV dose received by a fluid element is defined as the product of UV intensity and exposure time. The accumulated UV dose received by a fluid element exiting the device is the sum of the individual doses received at each position. Since the UV intensity is attenuated with the distance from the UV source, it is desirable to mix fluid elements from regions far from the UV source to regions of higher intensity nearer to the source, thereby ensuring they receive an adequate dose of UV radiation. This type of mixing is particularly desirable when the transmittance of UV radiation through the fluid being treated is low, causing an increase in the attenuation of UV intensity with distance from the source—this is commonly encountered in UV disinfection devices for the treatment of wastewater.

U.S. Pat. No. 5,846,437 [Whitby et al. (Whitby)], assigned to the assignee of the present application, teaches turbulent mixing in a UV system. More specifically, Whitby teaches the use of one or more ring-shaped devices (e.g., washers) at predetermined locations on the exterior surface of each lamp unit in the system and/or ring-shaped devices upstream of each lamp unit to increase turbulent mixing of fluid passing by the lamp units. While the use of such ring-shaped devices as taught in Whitby is useful in increasing turbulence between the lamp units, the turbulent flow of fluid tends to be of a random or non-ordered (e.g., isotropic) nature.

In many systems, such as those where the mixing zone is longitudinal with respect to the direction of fluid flow therethrough, it is desirable to have plug flow in the axial direction and effective mixing in the radial direction. A specific or ordered pattern of fluid flow in the mixing zone is desirable (e.g., a "particle" of fluid oscillating toward and away from the lamp as it passes longitudinally with respect thereto), which is in contrast to general mixing in all directions (i.e., in contrast to random mixing or turbulence taught by Whitby). A longitudinal vortex is an example of this type of flow pattern. Vortices can be formed actively through energy input to the fluid, such as by employing a motorized fluid impeller.

Another means of achieving vortex generation is through the use of a passive element which is designed to cause the formation of the desired flow pattern (vortex generator).

U.S. Pat. Nos. 5,696,380, 5,866,910 and 5,994,705 [all in the name Cooke et al. (Cooke)] teach a flow-through photochemical reactor. The subject reactor taught by Cooke comprises an elongate annular channel in which is disposed an elongate radiation source. The channel includes static, fluid-dynamic elements for passively inducing substantial turbulent flow within the fluid as it passes through the channel. According to Cooke, each such static, fluid-dynamic element advantageously creates a pair of "tip vortices" in the fluid flow past each element. The "tip vortices" purportedly are counter-rotating about an axis parallel to the elongate annular chamber.

U.S. Pat. No. 6,015,229 [Cormack et al. (Cormack)], assigned to the assignee of the present application, teaches a fluid mixing device. The fluid mixing device comprises a series of "delta wing" mixing elements which cause the formation of vortices thereby improving fluid mixing. A specific embodiment of such a device illustrated in Cormack is the use of "delta wing" mixing elements to cause such vortex mixing between UV radiation sources in an array of such sources. This creates the potential for increasing distance between adjacent UV radiation sources in the array which, in turn, allows for a reduction in hydraulic head loss of the fluid flow through a UV disinfection system comprising the fluid mixing device.

Despite the advances in the art made by Cooke and Cormack, there is still room for improvement. For example, there is an ongoing need for fluid mixing devices which, when used in fluid treatment devices such as UV disinfection systems, are capable of improving the UV radiation dose equivalent (this term will be described in more detail hereinbelow) delivered by the disinfection system to the fluid being treated.

Further, the vortex generating devices taught by Cooke and Cormack use the kinetic energy of the flowing fluid to cause mixing. This necessarily results in a loss of fluid pressure, or fluid head in an open channel system. This is very undesirable in UV disinfection systems, particularly those used to treat municipal wastewater, since the UV disinfection system typically is the last station of the multi-station treatment plant. As such, wastewater entering the treatment plant typically suffers hydraulic head loss as it passes from station to station with the result that, when the wastewater reaches the UV disinfection system, there is not much room for further significant loss of hydraulic head. Accordingly, it would be highly desirable to have a fluid mixing device which, in addition to improving dose equivalent as described above when used in a UV disinfection system, resulted in reducing the hydraulic head loss of fluid being treated by the UV disinfection system.

SUMMARY OF THE INVENTION

It is an object of the invention to provide a novel fluid mixing device which obviates or mitigates at least one of the above-mentioned disadvantages of the prior art.

It is an object of the invention to provide a novel method for mixing a fluid which obviates or mitigates at least one of the above-mentioned disadvantages of the prior art.

It is an object of the invention to provide a novel fluid treatment system comprising a fluid mixing device which obviates or mitigates at least one of the above-mentioned disadvantages of the prior art.

Accordingly, in one of its aspects, the present invention provides a fluid mixing device for mixing a fluid having a direction of fluid flow, the device comprising at least one mixing element to create at least one vortex adjacent to a surface downstream of the mixing element, the mixing element having a first normal located at a centroid thereof and the surface having a second normal which intersects the first normal at the centroid, wherein the first normal, the second normal and the direction of fluid flow are in a non-planar relationship.

In another of its aspects, the present invention provides a fluid mixing device comprising at least one mixing element for mixing a flow of fluid having a direction of fluid flow, the at least one mixing element comprising a surface having a first normal which is:

(i) acutely angled with respect to a first plane having a second normal substantially perpendicular to the direction of fluid flow; and (ii) acutely angled with respect to a second plane parallel to the direction of fluid flow and orthogonal to the first plane.

In yet another of its aspects, the present invention provides a fluid mixing device comprising at least one mixing element for mixing a flow of fluid having a direction of fluid flow, the at least one mixing element comprising a surface having a normal which is acutely angled with respect to each of two planes which are orthogonal to one another, each plane intersecting on a line substantially parallel to the direction of fluid flow.

In yet another of its aspects, the present invention provides a fluid mixing device comprising at least one mixing element for mixing a flow of fluid having a direction of fluid flow, the at least one mixing element comprising a surface having a normal which is acutely angled with respect to a first plane and a second plane which is orthogonal to the first plane, the first plane and the second plane intersecting on a line substantially parallel to the direction of fluid flow.

In yet another of its aspects, the present invention provides a fluid mixing device for mixing a fluid having a direction of fluid flow, the device comprising at least one mixing element to create at least one vortex adjacent to a surface downstream of the mixing element, the mixing element oriented in a manner such that a single rotation around its nearest edge to the surface causes the mixing element to become parallel to a tangent to the surface at a point nearest to the mixing element, describing an axis of rotation that is oblique with respect to the direction of fluid flow.

In yet another of its aspects, the present invention provides a method for mixing a fluid having a direction of fluid flow, the method comprising the steps of:

(i) disposing the at least one mixing element in the fluid flow; and (ii) positioning the at least one mixing element to create at least one vortex adjacent to a surface downstream of the mixing element such that the mixing element has a first normal located at a centroid thereof and the surface has a second normal which intersects the first normal at the centroid, wherein the first normal, the second normal and the direction of fluid flow are in a non-planar relationship.

In yet another of its aspects, the present invention provides a method for mixing a fluid having a direction of fluid flow, the method comprising the steps of:

(i) disposing the at least one mixing element in the fluid flow; and (ii) positioning the at least one mixing element such that a surface thereof has a normal which is acutely angled with respect to a first plane and a second plane which is orthogonal to the first plane, the first plane and the second plane each having an axis of rotation substantially parallel to the direction of fluid flow.

Thus, the present inventors have designed a novel fluid device having at least one mixing element oriented in a manner to achieve improved mixing of the fluid.

To understand the novel structure of one embodiment of the present fluid mixing device, it is appropriate to consider a fluid mixing device for mixing a fluid having a direction of fluid flow, the device comprising at least one mixing element. The mixing element is designed to create at least one vortex adjacent to a surface the mixing device which is downstream of the mixing element. The mixing element comprises a centroid. As used throughout this specification, the term "centroid" is intended to mean the position or point on the mixing element corresponding its center of its mass, the point at which the mixing element would be stable, or balance, under the influence of gravity—the is also conventionally referred to as the center of gravity. The mixing element is oriented in the fluid flow in a manner such that a first normal located at the centroid of the mixing element intersects a second normal emanating from the surface at the centroid of the mixing element such that the first normal, the second normal and the direction of fluid flow are in a non-planar relationship—see FIG. 2. In contrast, Cooke and Cormack teach a mixing element disposed in the fluid flow in a manner such that the first normal, the second normal and the direction of fluid flow are in a planar relationship—see FIG. 1.

This novel orientation of the mixing element results in improved fluid mixing. When the fluid mixing device is employed in a fluid treatment system such as UV disinfection system the improved fluid mixing is manifested in an improvement of UV dose delivery of the system. Additionally, in various preferred embodiments of the present fluid mixing device, such improved fluid mixing is accompanied by a reduction in hydraulic head loss of fluid passing through the system.

BRIEF DESCRIPTION OF THE DRAWINGS

Embodiments of the present invention will be described with reference to the accompanying drawings, wherein like numerals designate like elements, and in which:

FIG. 1 illustrates a Cormack-type mixing element pointed downstream to the direction of fluid flow;

FIG. 2 illustrates an embodiment of the present fluid mixing device wherein the mixing element is pointed upstream with respect to the direction of fluid flow

FIG. 3b illustrates a top view of FIG. 3a;

FIG. 3c illustrates a front view of FIG. 3a;

FIG. 3d illustrates a side view of FIG. 3a;

DETAILED DESCRIPTION OF THE PREFERRED EMBODIMENTS

Throughout this specification, reference will be made to employment of the present fluid mixing device in fluid treatment systems such as fluid radiation treatment systems (e.g., UV disinfection systems). Those of skill in the art will recognize that, while the preferred embodiment of the present invention is a fluid radiation treatment system incorporating the present fluid mixing device, the scope of the invention is not to be so limited. Specifically, it is envisioned that the present fluid mixing device will have many applications outside the art of fluid radiation treatment systems.

As used throughout this specification, repeated reference is made to the term "normal". In connection with a point on a planar surface, the term "normal" is intended to mean a line perpendicular to the tangent plane at that point on the surface. In connection with a point on a curved surface, the term "normal" is intended to mean a line perpendicular to the tangent plane at that point on the surface.

With reference to FIGS. 3a–3d, an explanation will be provided on orientation of the mixing element(s) in certain embodiments of the present fluid mixing device. This explanation should be read in the context of the non-planar relationship of the first normal, the second normal and the direction of fluid flow described above. This orientation is exemplified in a number of different embodiments which will be described hereinbelow.

As shown in FIGS. 3a–3d, a co-ordinate system is defined by two fixed planes X,Y. Planes X,Y intersect at an axis (or at a line) which is common to the direction of fluid flow through the fluid mixing device.

As shown, a pair of fixed mixing elements 10,12 are disposed on the co-ordinate system defined by planes X,Y. Mixing elements 10,12 converge to an apex region 14 which is oriented in a direction opposite to the direction of fluid flow (this is a preferred embodiment only and the orientation of the apex could be reversed if desired).

Figure 3B:
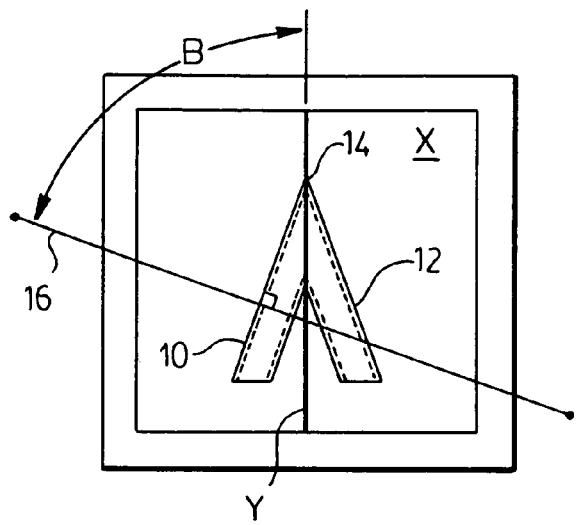
Figure 3A:
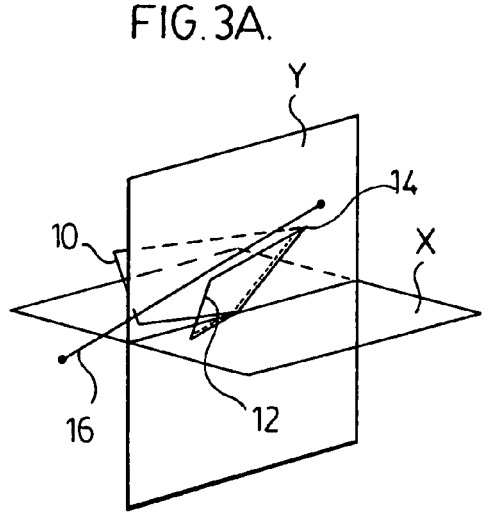
FIG. 3a illustrates an isometric view of a schematic representation of disposition of a mixing element in the present fluid mixing device in a co-ordinate system defined by two orthogonal planes.
Figure 3C:
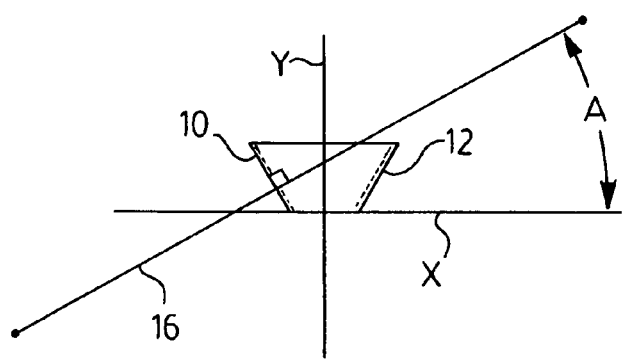
Figure 3D:
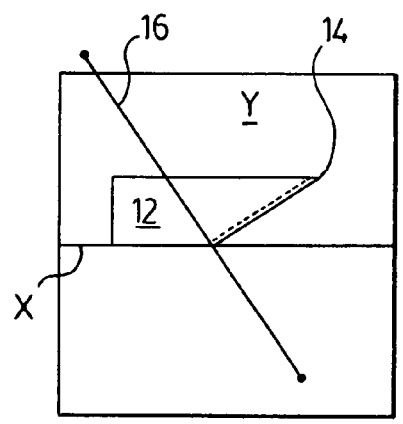

With reference to FIG. 3b, a normal 16 to mixing element 10 has been illustrated. With further reference to FIG. 3b, it will be apparent that normal 16 forms an acute angle B with respect plane Y. With reference to FIG. 3c, it will be seen that normal 16 forms an acute angle A with respect to plane X. Thus, normal 16 forms independent acute angles to each of planes X,Y.

In the discussion which follows with respect to the embodiments illustrated in FIGS. 5–8 and 10–16, the feature of the non-planar relationship of the first normal, the second normal and the direction of fluid flow described above is exemplified.

As will be appreciated by those of skill in the art, there are many embodiments which may be conceived within the scope of the present fluid mixing device. A number of these will be discussed below however, those of skill in the art will readily recognize that many other embodiments are possible. Further, while some details of attachment of the mixing elements to other elements in the mixing device are provided (see, for example, FIGS. 17 and 18), the precise details will vary from application to application and are within the purview of person skilled in the art—see, for example, Cormack.

In a preferred embodiment of the present fluid mixing device, a pair of mixing elements is utilized. A pair of mixing surfaces allows each surface to be positioned independently while still generating pairs of counter-rotating vortices. This means that splitting a single surface generating two vortices into a pair of surfaces each generating a vortex increases flexibility in the overall orientation of the surfaces, and permits optimization that is otherwise difficult to achieve.

Orienting (e.g., by angling) each surface with respect to two planes as described above causes the projected area of the surface in the direction of fluid flow to decrease with minimal change to the actual surface area. A reduction in projected area is desirable because the projected area in the direction of fluid flow is related to the fluid energy loss created by the surface. By virtue of the change in shape presented to the fluid flow, mixing performance can also be increased.

Mixer performance may also be improved by increasing the length of the leading edge. One possible means of accomplishing this is through curvature of the edge. This increases edge length for a given projected area of the surface in the direction of fluid flow. The total edge length available at a given position may be adjusted by selecting an appropriate curvature. This means that the strength of the vortex need not be constant with radial position. This can be particularly advantageous in UV disinfection systems, where it is desirable to mix fluid elements far from the UV to positions near the source. The same logic can be applied to curvature of the face of the mixing surface. This can increase the actual surface area for a given projected area, and the degree of curvature may be similarly chosen so as to alter the strength of mixing as a function of radial position. Both types of curvature can be used alone or in combination to increase the overall mixing effectiveness of a vortex generating static mixing device.

By creating a passage for fluid flow between the pair of mixing surfaces, disinfection performance can be improved. The degree of improvement depends, at least in part, on the size of the opening and the position of the surfaces. The open passage may be created either by removing surface area from each surface, or preferably, by repositioning each surface so as to preserve overall actual or effective area. If surface area is removed, the net effect of an open passage for fluid flow can be to reduce disinfection performance and fluid energy loss. The open passage for fluid flow can only be accomplished with a pair of surfaces. The trailing edge created by separating the surfaces may also be curved so as to minimize the formation of vortices which could destabilize the main vortex created by the leading edge. Open passages for fluid flow and curved edges have the added advantage of being relatively resistant to debris fouling in systems where this is a concern, such as in UV disinfection systems for the treatment of wastewater.

Generating pairs of vortices with a pair of surfaces increases overall flexibility of a static mixing device by allowing the optimization of mixing effectiveness and fluid energy loss. Angling the mixing surfaces to achieve the non-planar relationship of the first normal, the second normal and the direction of fluid flow as described above, can decrease overall fluid energy loss and increase mixing effectiveness. Applying curvature to the edges or faces of the mixing surface also increases mixing performance and, in some cases, decreases overall fluid energy loss. Additional increase in mixing performance or reduction in fluid energy loss can be achieved by creating a passage for fluid flow between surfaces. The combination of these elements to create devices which are optimized with respect to both mixing effectiveness and overall fluid energy loss is an advantage of the present mixing device.

One tool used to visualize fluid flow patterns is computational fluid dynamics (CFD). CFD is the analysis of fluid flow systems using computer based simulations, and is widely used to solve heat and mass transfer problems. It is commonly employed in such diverse areas as aerodynamics, chemical process design, and environmental engineering. CFD is a numerical model of the Navier-Stokes equations describing fluid behaviour. The geometry of interest is sub-divided by a "mesh" of individual nodes at which the fluid flow interactions are solved through an iterative routine. An appropriate turbulence model can also be applied. Using CFD, the fluid flow patterns can be visualized, giving powerful insight into the conditions inside the flow geometry of interest. This information can be used to calculate differences in fluid behaviour caused by addition of various mixing surfaces, reducing design time as compared with a strictly experimental approach.

CFD is a powerful tool to compare mixers under identical conditions, without introducing a large number of experimental variables. A variety of mixers were tested using CFD to determine the impact of changes to design features such as projected area, actual area, edge length, space between pairs of mixing surfaces, etc. on disinfection performance and fluid energy loss. CFD can be used to generate the particle tracks of a finite number of neutrally buoyant, massless "particles". To simulate UV disinfection performance, a radiation model can be applied to generate fields of UV intensities throughout the reactor geometry. A post processing algorithm then takes the "particle" paths and integrates them with the intensity field to determine the amount (or "dose") of UV received by each fluid element. The histogram of UV doses is then analyzed using known kinetic models for microbial disinfection to arrive at an overall inactivation for the reactor. This overall inactivation is reported as the "dose equivalent" for the reactor; the dose that would have to be received by each fluid element passing through the reactor in order to achieve the calculated overall inactivation. This computational model, called CoDiM, is explained in more detail in Buffle et al., "UV Reactor Conceptualization and Performance Optimization With Computational Modeling.", Water Environment Federation, Mar. 15–18, 2000, New Orleans. See, also, Wright et al., "An Assessment of the Bioassay Concept for UV Reactor Validation.", Water Environment Federation, Mar. 15–18, 2000, New Orleans.

Comparing the disinfection performance of various mixing devices can be achieved by modelling them in the flow using CoDiM. The CoDiM package automatically determines the fluid energy loss, often reported as "pressure drop" or "head loss" for a given geometry. By choosing the same reactor geometry, energy input and flow rate, comparative performance of mixers can be fairly assessed. The mesh that is used by the CoDiM to calculate the flow field should be generated in the same way for each mixer design in order to compare results to minimize computationally introduced variability. Since changes to mixer design features often yield improvements in performance at the expense of energy loss, and vice versa, it is desirable to assess both factors at the same time. By plotting disinfection performance ("dose equivalent") and fluid energy loss ("head loss") on the same graph for each mixer design, assessed under the same conditions, a fair comparison of the designs can be made.

A virtual CFD model was constructed in order to compare the impact of changes to mixer features on dose equivalent and head loss under a consistent set of conditions. The CFD package used was Fluent v.5.0 (Lebanon, N.H.). A rectangular reactor 0.127 m×0.127 m×1.778 m (5"×5"×70") was designed in CoDiM. A single tubular UV radiation source sleeve was placed in the center of the reactor and acted as the support member for mixers. The UV radiation source had a radius of 0.023 m (0.89") and a length of 1.575 m (62"). The flow direction was parallel to the UV radiation source, and the inlet and outlet of the reactor were described as being in-line with the direction of flow. A bulk fluid velocity of 0.9 m/s was selected for all mixers, and water was chosen as the fluid. The CoDiM software then calculated the fluid flow field, providing outputs for pressure drop and particle tracks for microbes passing through the reactor.

In order to assess mixer performance, disinfection modelling using CoDiM was conducted with the particle tracks. A lamp arc length of 1.47 m (58") was used, and a lamp output of 90 W/m of germicidal UVC energy was selected. The fluid transmittance of UV light was selected at 60%. CoDiM then generated a dose histogram of the microbes passing through the reactor. The dose histogram is then used to generate the percentage of inactivation of incoming microbes. A first order kinetic model can then be applied to determine the required UV dose to achieve the required level of inactivation. In order to allow comparison of the dose equivalents for each mixer, a first order kinetic constant for microbe inactivation of 0.53 was used for all studies. Since the same set of conditions was used for all experiments, the dose equivalent can be used to indicate relative mixer efficiency, and allows comparisons of mixers to be made.

Figure 4:
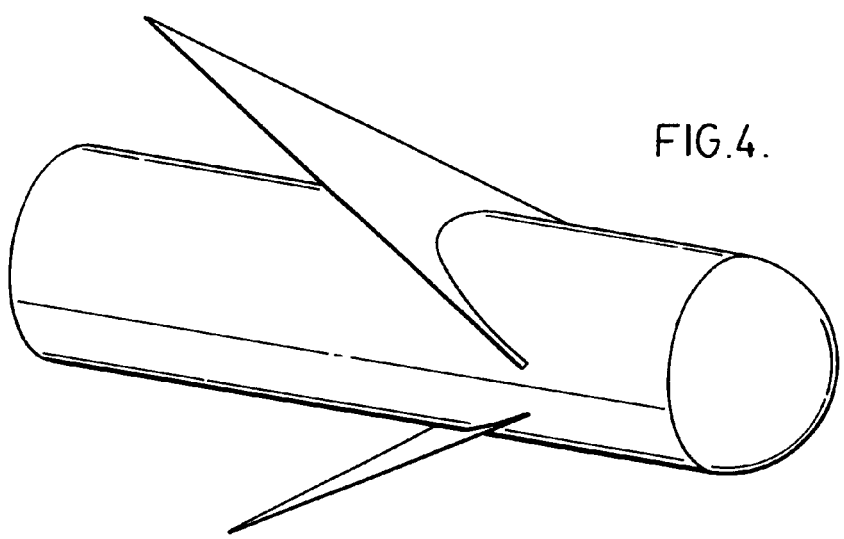
FIG. 4 illustrates a Cormack-type mixing element pointed downstream to the direction of fluid flow.

The basic mixer shape shown in FIG. 4 was used as a basis for all comparisons. The various mixer features were then added to this shape, preserving the original angle with respect to the UV radiation source. This approach of building upon the original shape allows comparisons of the impact of mixer features on dose equivalent and head loss as they are added individually. The additional features of each mixer that differentiate it from FIG. 4 are described hereinbelow in Table 1.

Figure 9:
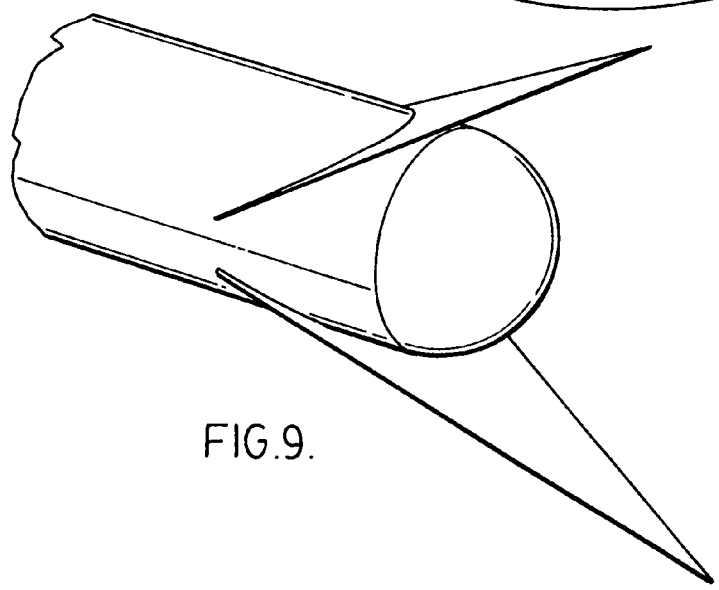
FIG. 9 illustrates a Cormack-type mixing element pointed upstream to the direction of fluid flow.

The angle between the mixing surface and the axis of flow is held constant at 28° for all embodiments in the noted Figures. Table 1 refers to a single mixing surface of each pair. FIGS. 4 and 9 are considered to be a pair of mixing surfaces butted together.

TABLE 1

| Figure Number | Actual Area ($m^2 \times 10^{-4}$) | Projected Area ($m^2 \times 10^{-4}$) | Leading Edge Length (m) |
| --- | --- | --- | --- |
| 4 | 7.75 | 3.75 | 0.117 |
| 5 | 7.75 | 3.75 | 0.117 |
| 6 | 7.75 | 3.75 | 0.117 |
| 7 | 15.75 | 8.25 | 0.119 |
| 8 | 9.75 | 4.50 | 0.117 |
| 9 | 7.75 | 3.75 | 0.117 |
| 10 | 15.75 | 7.00 | 0.117 |
| 11 | 19.50 | 8.25 | 0.119 |

FIG. 4 shows a three sided mixing element angled with respect to the main direction of fluid flow only. In this particular figure, the main direction of fluid flow is parallel to the support member of the mixing surface. This support member could be a UV radiation source, such as are used in the disinfection of water or wastewater, or it could be any other member which is parallel to the direction of fluid flow. As shown, the first normal, second normal, and the direction of fluid flow (discussed above) are in the same plane.

This particular mixing surface creates a pair of vortices from each of the two leading edges that rotate in opposite directions. It is possible to consider this mixing surface as a pair of surfaces forming two right triangles that are attached along one edge. By separating these two triangles, additional flexibility is gained in terms of angle and position that can be used to improve mixing performance and fluid energy loss.

Figure 5:
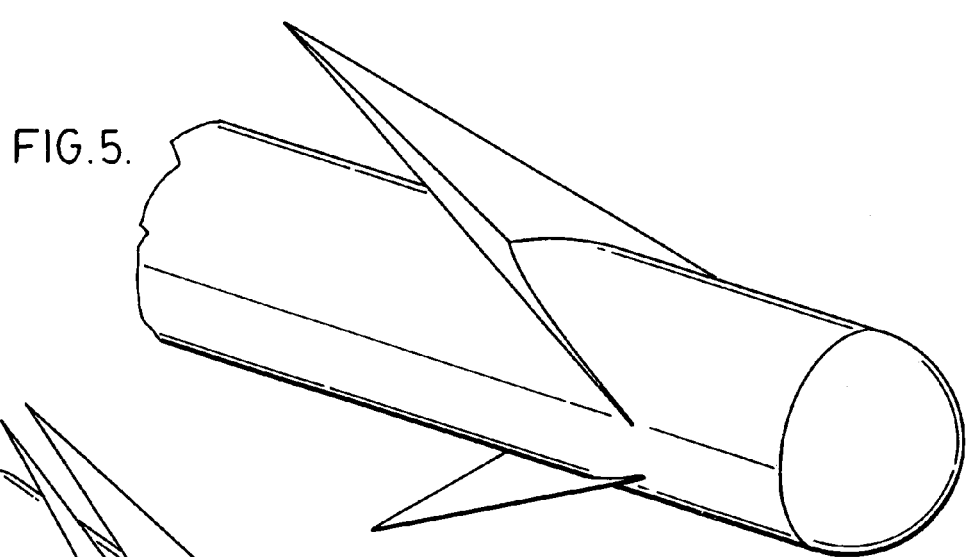
FIGS. 5–8 illustrate various embodiments of a Cormack-type mixing element pointed downstream to the direction of fluid flow.

With reference to FIG. 5, a pair of mixing elements is illustrated. Each mixing element includes a surface shown having a normal which is acutely angled with respect to both planes in the co-ordinate system illustrated in FIG. 3.

Figure 6:
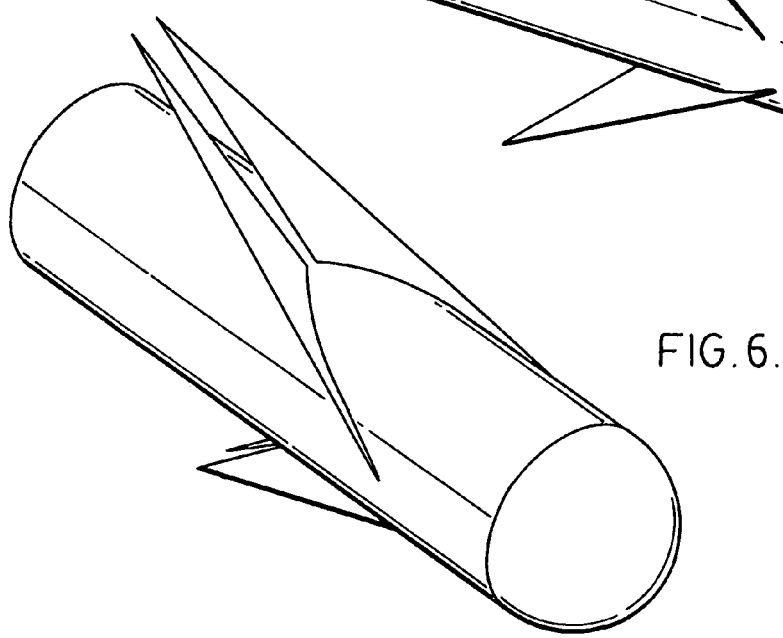

The pair of mixing surfaces shown in FIG. 6 is similar in orientation to those of FIG. 5, but a passage for fluid flow has been created between surfaces. In this case, the means of creating a passage for fluid flow is by separating each surface of the pair, keeping actual and projected surface area constant. This separation of surfaces can be achieved by repositioning each surface. An alternative passage for fluid flow can be created by simply removing material from each mixing surface, resulting in a decrease of both effective surface area and projected area.

Figure 7:
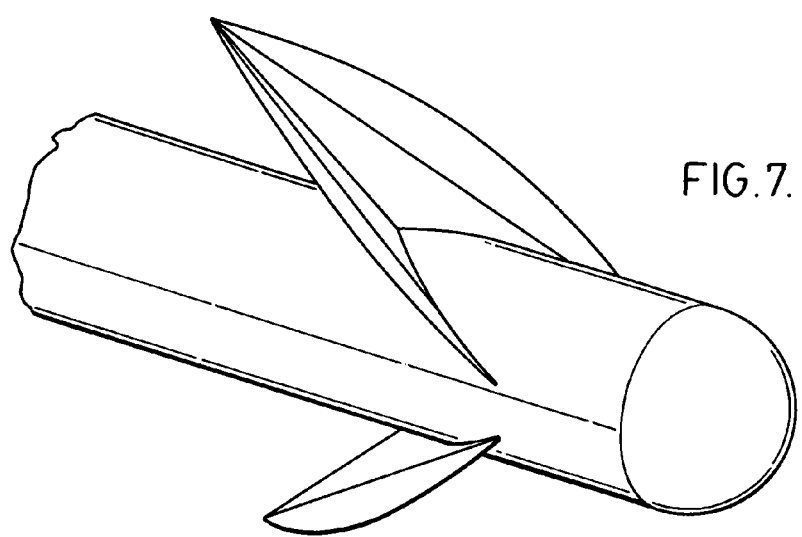

The pair of mixing surfaces shown in FIG. 7 is similar to those of FIG. 5. In FIG. 7 the mixing elements have curved leading edges. These curved leading edges increase projected area and actual surface area, and increase total mixing edge length while preserving acute angles with respect to each of two orthogonal planes, each plane having an axis parallel to the direction of fluid flow.

Figure 8:
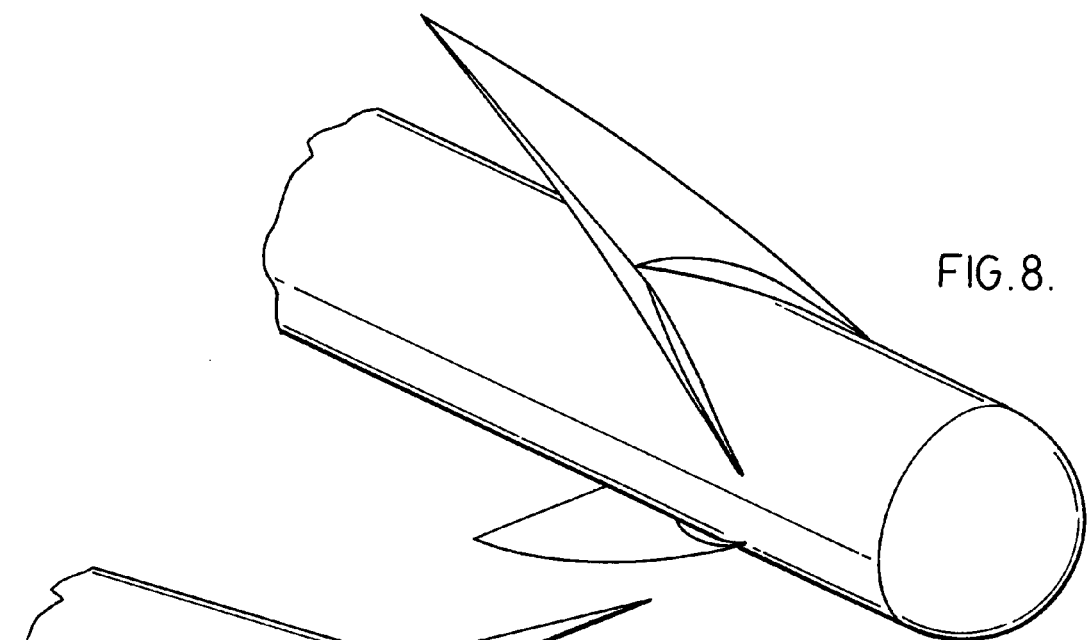

FIG. 8 shows a pair of mixing surfaces similar to those of FIG. 5. In FIG. 8, the mixing surfaces themselves are curved and include curved leading and trailing edges.

Further adjustment of angles, curves, opening sizes, etc. of the embodiments illustrated in FIGS. 5–8 can be designed to arrive at an optimized mixing surface for a given set of conditions, such as support size, spacing between adjacent supports, and desired degree of disinfection performance vs. head loss.

Figure 19:
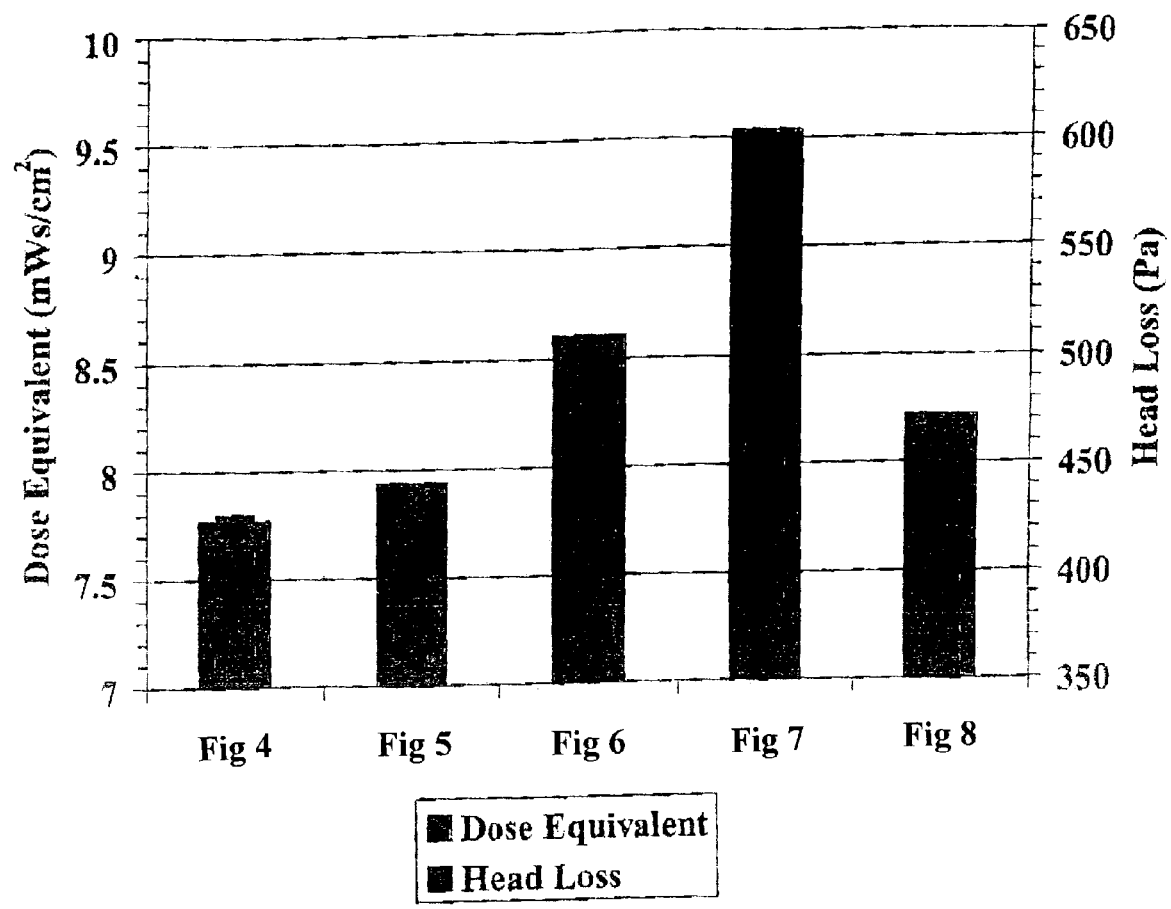
FIG. 19 shows relative mixing efficiency and fluid energy loss of the fluid mixing devices illustrated in FIGS. 4–8 (mixing efficiency is measured by UV Dose Equivalent (mW-s/cm$^2$) and fluid energy loss by Head Loss (Pa)

With reference to FIG. 19, it can be seen that the mixing elements in FIG. 5 result in improved disinfection performance as compared with the mixing elements of FIG. 4, together with a reduction of fluid energy loss. The increase in disinfection performance accompanied by a reduction fluid energy loss is an unexpected result, since the projected area, actual area and edge length remain constant. This is by virtue of the non-planar relationship of the first normal, the second normal and the direction of fluid flow described above FIG. 19 illustrates that an open passage for fluid flow between surfaces as illustrated in FIG. 6 increases disinfection performance with a concurrent reduction in head loss compared with the results for the mixing device illustrated in FIG. 4. The open passage has the further benefit of reducing the tendency for debris fouling, which can significantly impact mixer performance in high fouling applications, such as in wastewater disinfection.

FIG. 19 further illustrates that the embodiment of FIG. 7 significantly improves disinfection performance compared with the embodiment of FIG. 4. Although hydraulic head loss increased with the embodiment of FIG. 7, the fluid mixing device is useful in applications were enhanced disinfection performance is more important than minimizing hydraulic head loss, and in combination with other embodiments discussed herein.

With further reference to FIG. 19, it can be deduced that, by applying curved surfaces to the mixing elements, as in FIG. 8, projected and actual area increase while edge length remains nearly constant. This combination creates additional mixing, which translates to improvements in disinfection performance.

FIG. 9 illustrates mixing elements which are of similar shape and orientation to the surface shown in FIG. 4, but reversed with respect to the direction of flow.

Figure 10:
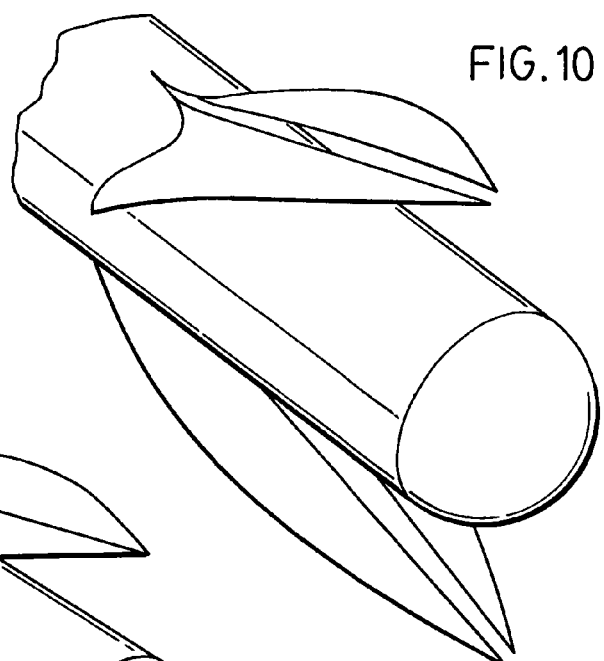
FIGS. 10–11 illustrate various embodiments of the present fluid mixing device wherein the mixing element is pointed upstream with respect to the direction of fluid flow.
Figure 11:
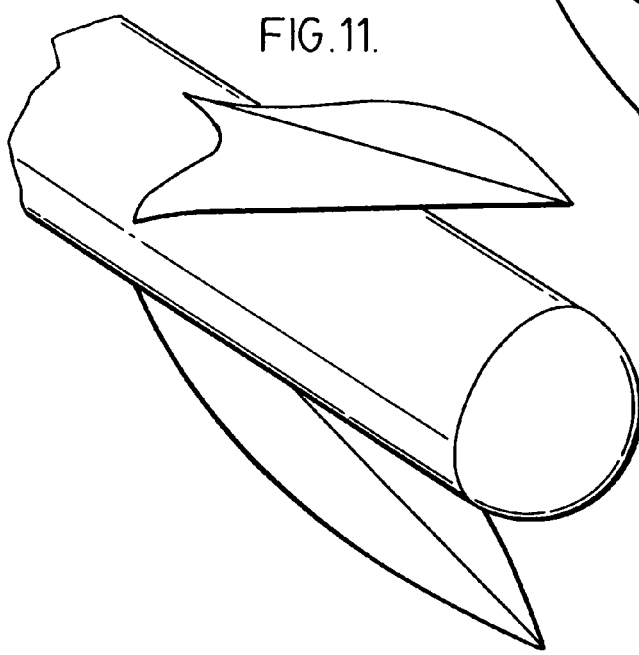

Various features of the mixing elements illustrated in FIGS. 5–8 were selected and combined to arrive at the mixing elements in FIGS. 10 and 11.

Figure 20:
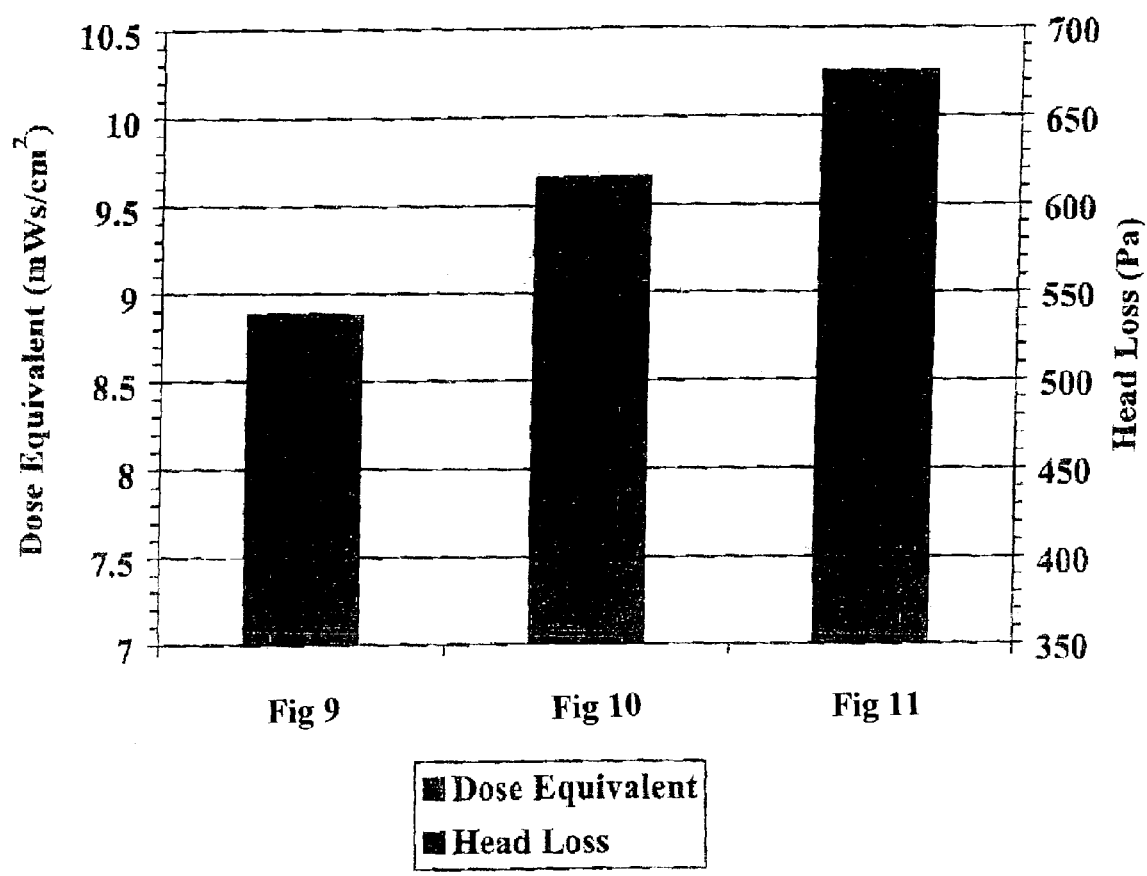
FIG. 20 shows relative mixing efficiency and fluid energy loss of the fluid mixing devices illustrated in FIGS. 9–11 (mixing efficiency is measured by UV Dose Equivalent (mW-s/cm$^2$) and fluid energy loss by Head Loss (Pa).

As can be seen with reference to FIG. 20, an improvement in disinfection performance is achieved in the fluid mixing devices of FIGS. 10 and 11, compared with that of FIG. 9. Although hydraulic head loss increased with the embodiments of FIGS. 10 and 11, the fluid mixing devices are useful in applications were enhanced disinfection performance is more important than minimizing hydraulic head loss, and in combination with other embodiments discussed herein. The fluid mixing devices of FIGS. 10 and 11 delivered the greatest dose equivalent of any of the mixing devices tested. In the embodiment shown in FIG. 10, the open passage for fluid flow between mixing surfaces was created by removing actual surface area from each mixer, resulting in a decrease of disinfection performance and head loss.

FIGS. 12–16 illustrate further fluid mixing devices falling within the scope of the present invention.

Figure 12:
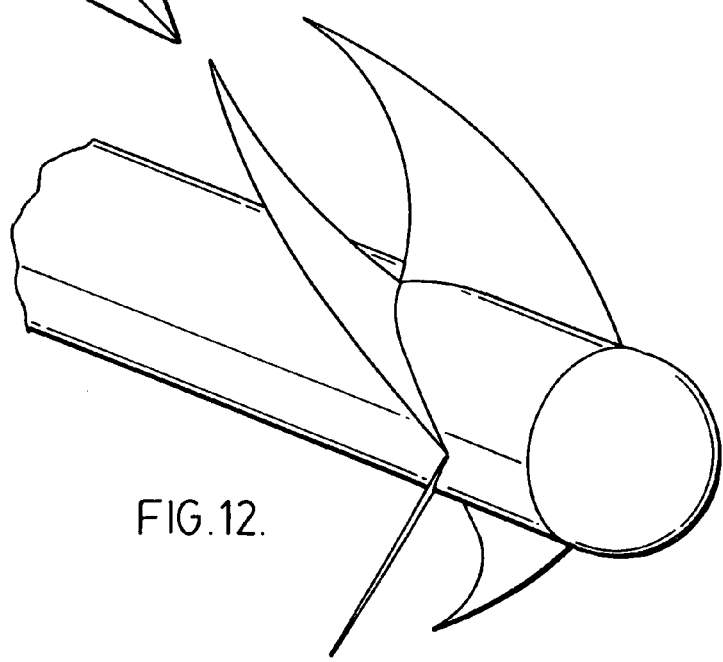
FIG. 12 illustrates a further embodiment of the present fluid mixing device wherein the mixing element is pointed downstream with respect to the direction of fluid flow.

FIG. 12 shows an embodiment four "fin-shaped" mixing surfaces. Each mixing surface is three-sided and generally curved. For a given pair of theses mixing surfaces, a generally lens shaped opening is defined by opposed concaved-shaped sides of the two mixing surfaces.

Figure 13:
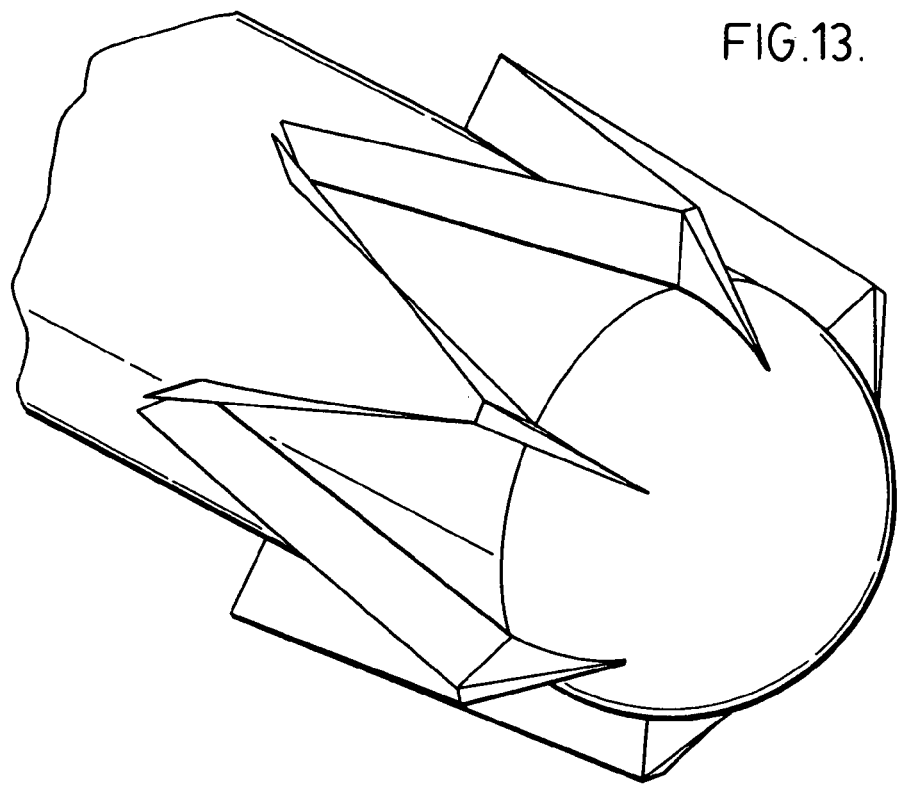
FIGS. 13–16 illustrate further embodiments of the present fluid mixing device.

FIG. 13 shows an embodiment of pairs of four sided mixing surfaces. The faces of the surfaces are curved such that the surfaces are always normal to the support surface at each point in the longitudinal direction. In UV disinfection of water, this provides minimal shadowing of the water being treated, improving overall disinfection performance. The curvature was chosen in this system such that the edges are straight, but they could also be curved. The mixer embodiment shown in this Figure has open passages for fluid flow between pairs of fins.

Figure 14:
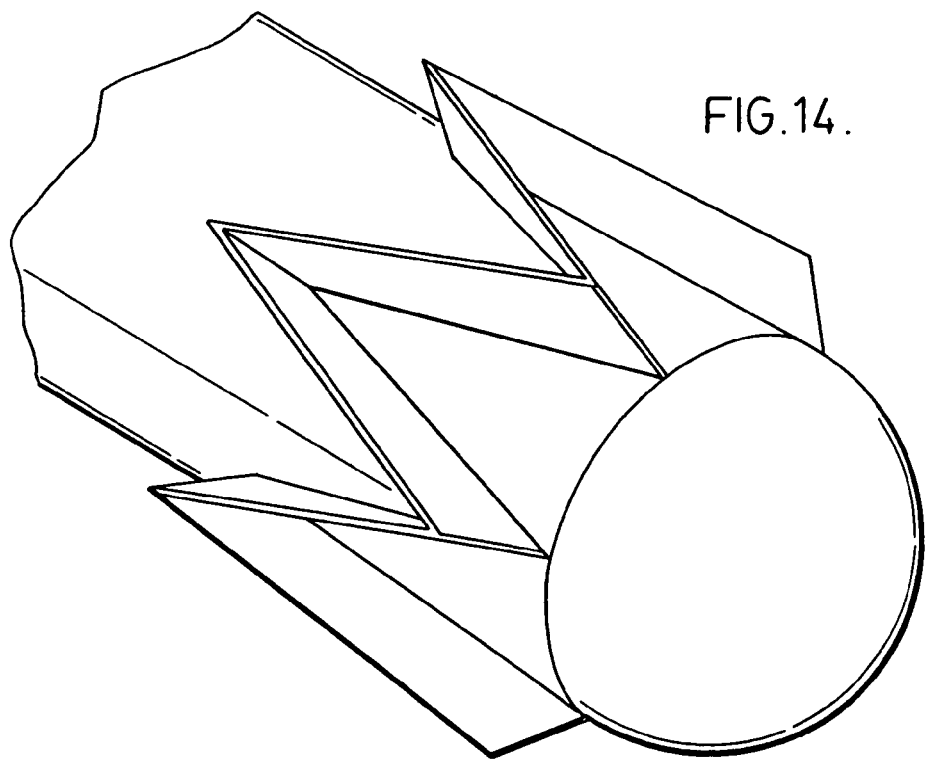

The mixer shown in FIG. 14 is similar in most respects to the mixing device illustrated in FIG. 13 except for the omission of the openings between adjacent fins for fluid flow.

Figure 15:
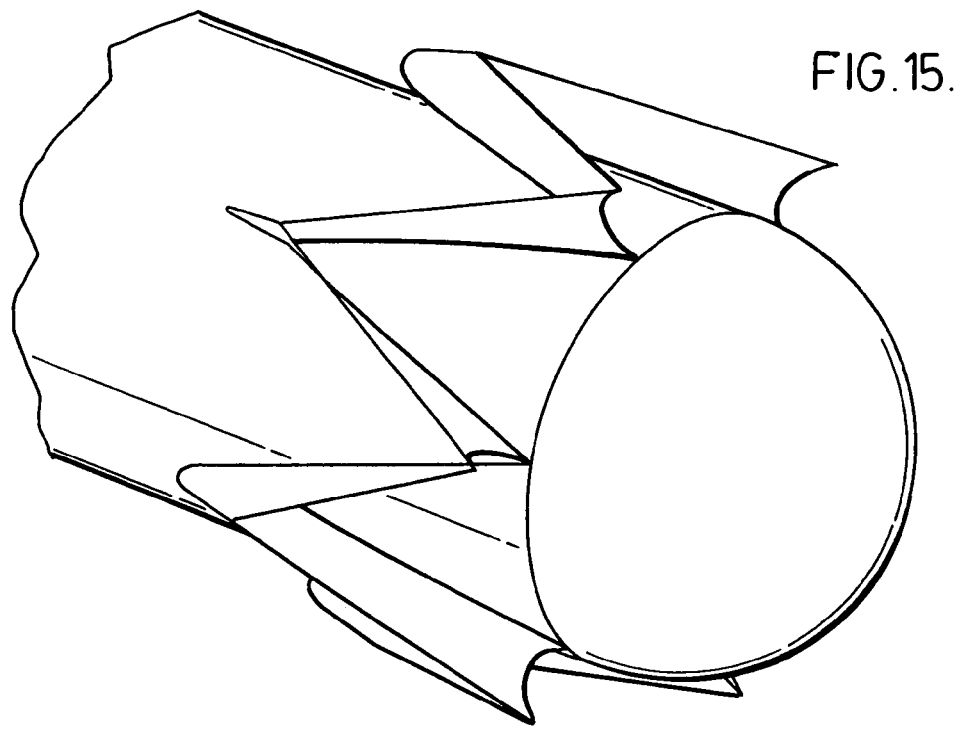

FIG. 15 shows another embodiment of pairs of four sided mixing surfaces with curved edges and faces.

The principles described above can be applied in the creation of additional four sided surfaces, other than those shown in these preferred embodiments. The number of pairs of mixing surfaces mounted to a given support is chosen based upon the geometry of adjacent support members.

Figure 16:
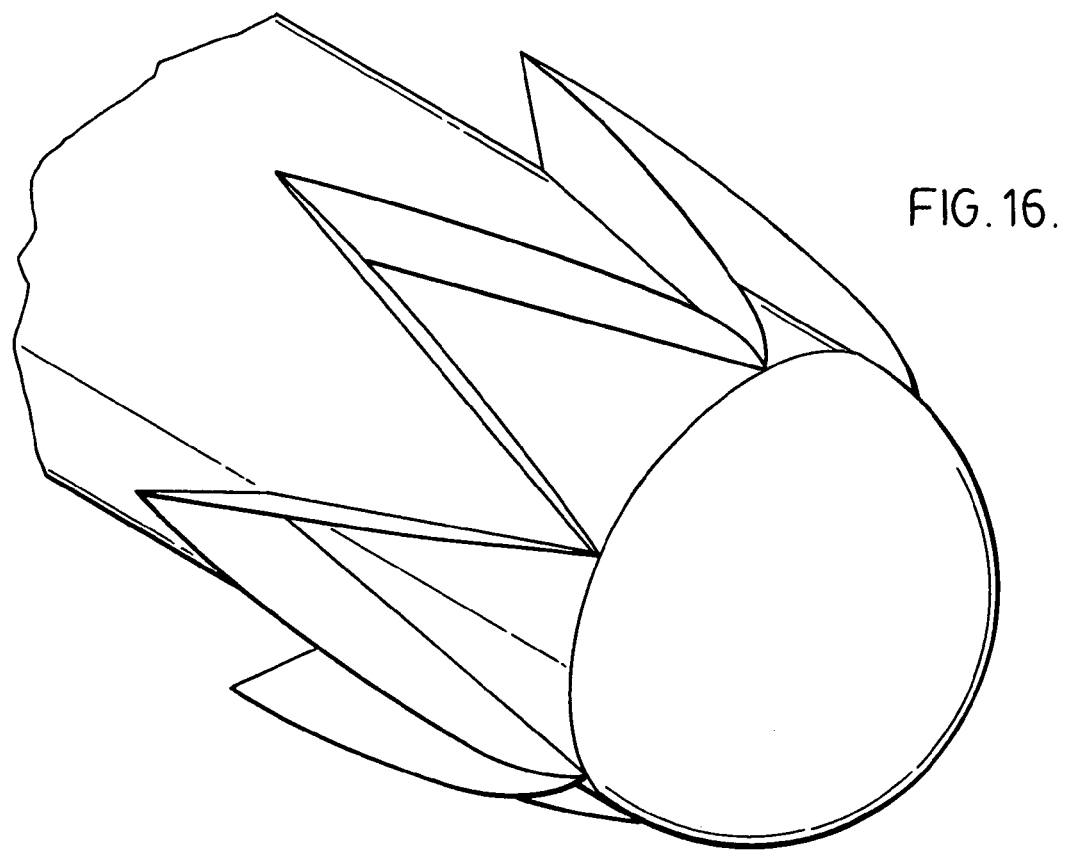

FIG. 16 illustrates a number of pairs of three sided mixing surfaces with curved edges and no spaces between pairs of mixing surfaces. Additional optimization of this mixer embodiment is possible by selective application of the principles previously disclosed.

Figure 17:
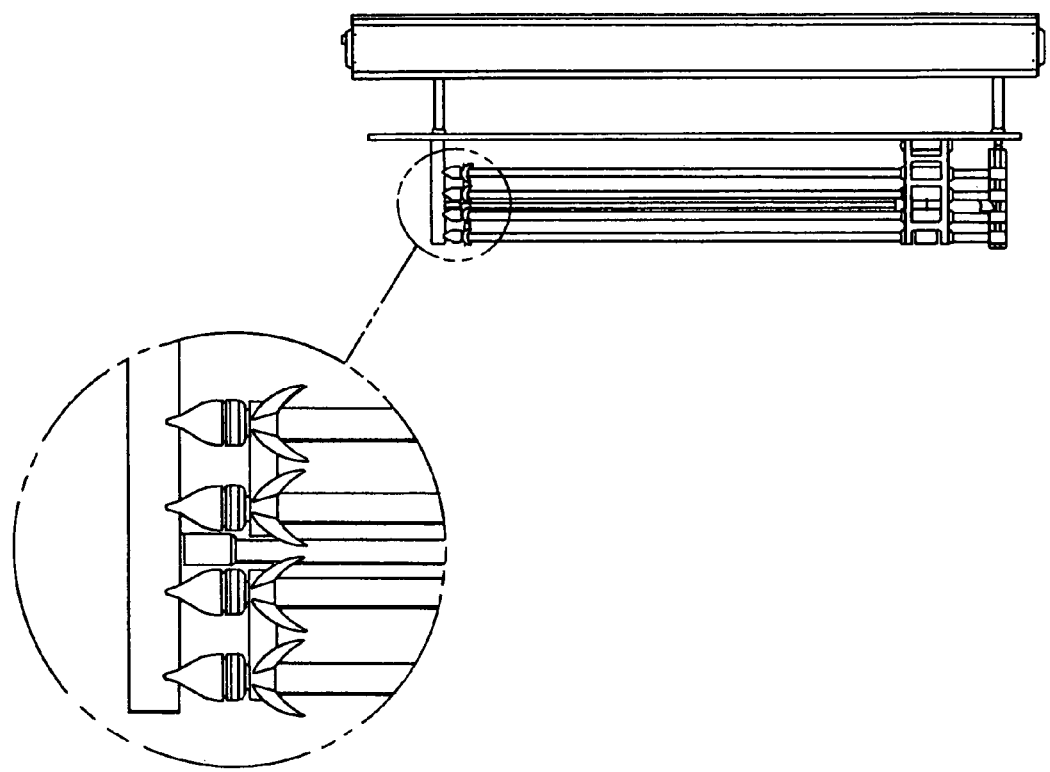
FIG. 17 shows a preferred embodiment of the fluid mixing device of FIG. 12 applied to a UV disinfection module for the treatment of water and wastewater in an open channel system.

FIG. 17 shows a preferred embodiment of a mixer mounted to a UV disinfection module. Details on the construction of such a module may be found in the following documents:

U.S. Pat. No. 4,482,809 [Maarschalkerweerd];
U.S. Pat. No. 4,872,980 [Maarschalkerweerd];
U.S. Pat. No. 5,006,244 [Maarschalkerweerd];
International publication number WO 00/51943 [Traubenberg et al. (Traubenberg)]; and
International publication number WO 00/26144 [Pearcey et al. (Pearcey)].

The mixer elements are similar to the ones illustrated in FIG. 12. The direction of flow is parallel to the radiation sources, preferably from left to right in FIG. 17. A given pair of mixers is split in half in order to be mounted to the radiation sources from either side. This method of attachment allows the mixer to be easily added to the UV disinfection module after manufacturing. The position of the mixing surfaces is chosen such that it is mounted as close as possible to the UV radiation source surface, upstream of the radiation sources.

Figure 18A:
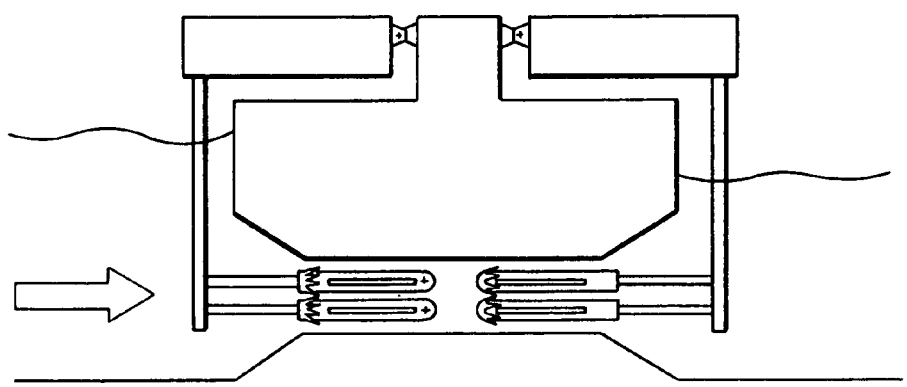
FIGS. 18a, 18b and 18c illustrate a preferred embodiment of the fluid mixing device of FIG. 14 applied to a UV disinfection module for the treatment of water and wastewater in a fluid treatment system comprising a closed fluid irradiation zone.
Figure 18B:
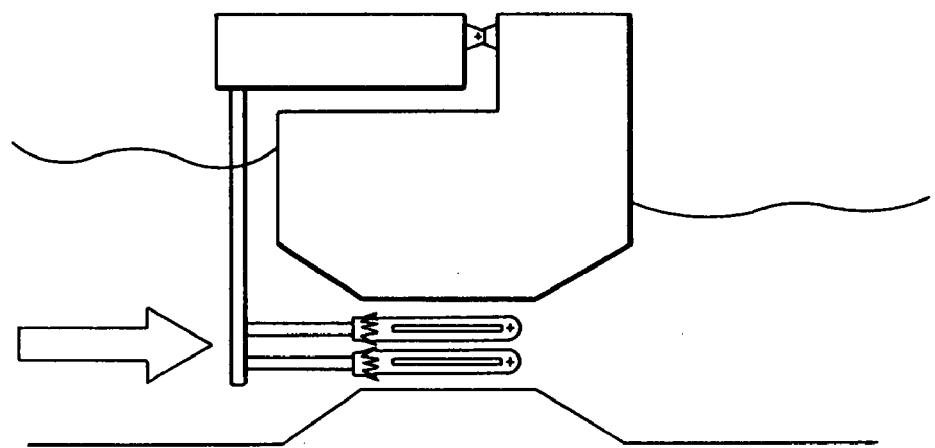
Figure 18C:
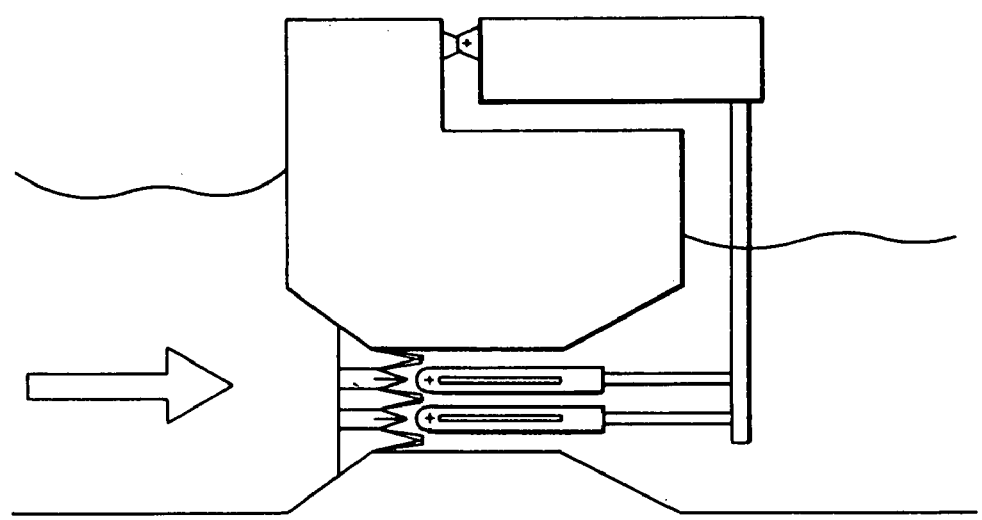

FIGS. 18a, 18b and 18c illustrated embodiments of a mixing device mounted to another type of UV disinfection module. Details on the construction of such a device may be found in Cormack referenced above and the following documents:

U.S. Pat. No. 5,418,370 [Maarschalkerweerd];
U.S. Pat. No. 5,539,210 [Maarschalkerweerd]; and
U.S. Re Pat. No. 36,896 [Maarschalkerweerd].

The mixer elements included in this embodiment is that of FIG. 14. Since the mixing elements are preferably mounted upstream of the radiation sources in order to produce the desired effects on disinfection performance, mixing elements may be mounted to different parts of the module, depending on whether the radiation source support members are located upstream or downstream. FIG. 18a illustrates a double module (i.e., upstream and downstream modules) fluid treatment system and illustrates the position of mixing elements in relation to the direction of the flow of fluid. FIG. 18b illustrates a single module (i.e., upstream module) fluid treatment system. As an alternate embodiment, FIG. 18c illustrates mount of the mixing elements to the housing of the fluid treatment system rather than to the module.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A fluid radiation treatment system having a direction of fluid flow, the system comprising:
    a surface configured to be disposed substantially parallel to a direction of fluid flow; and
    two mixing elements disposed with respect to said surface such that each mixing element is configured to generate at least one fluid vortex adjacent to the surface, downstream of the mixing element, at least one mixing element having a first normal located at a centroid thereof, the two mixing elements being oppositely angled with respect to a plane passing through the longitudinal axis of the surface, and
    the surface having a second normal which intersects the first normal at the centroid,
    wherein the first normal, the second normal, and the direction of fluid flow are in a non-planar relationship.

2. The fluid radiation treatment system defined in claim 1, wherein each mixing element comprises a leading edge.

3. The fluid radiation treatment system defined in claim 2, wherein the leading edge comprises a substantially curved edge.

4. The fluid radiation treatment system defined in claim 2, wherein the leading edge comprises a substantially straight edge.

5. The fluid radiation treatment system defined in claim 1, wherein each mixing element comprises a trailing edge.

6. The fluid radiation treatment system defined in claim 5, wherein trailing edge comprises a substantially curved edge.

7. The fluid radiation treatment system in claim 5, wherein the trailing edge comprises a substantially straight edge.

8. The fluid radiation treatment system defined in claim 1, wherein each mixing element comprises a leading edge and a trailing edge.

9. The fluid radiation treatment system defined in claim 8, wherein the leading edge and trailing edge are substantially parallel.

10. The fluid radiation treatment system defined in claim 9, wherein the leading edge and the trailing edge are interconnected by a wing tip edge.

11. The fluid radiation treatment system defined in claim 10, wherein the wing tip edge comprises an edge substantially parallel to the direction of fluid flow.

12. The fluid radiation treatment system defined in claim 8, wherein the leading edge and the trailing edge are non-parallel.

13. The fluid radiation treatment system defined in claim 12, wherein the one of the leading edge and the trailing edge is substantially perpendicular to the direction of fluid flow.

14. The fluid radiation treatment system defined in claim 1, wherein the at least one mixing element comprises a planar surface.

15. The fluid radiation treatment system defined in claim 1, wherein the at least one mixing element comprises a curved surface.

16. The fluid radiation treatment system defined in claim 1, wherein the at least one mixing element comprises an apex portion.

17. The fluid radiation treatment system defined in claim 16, wherein the apex portion is oriented to point substantially upstream with respect to the direction of fluid flow.

18. The fluid radiation treatment system defined in claim 16, wherein the apex portion is oriented to point substantially downstream with respect to the direction of fluid flow.

19. The fluid radiation treatment system defined in claim 1, wherein the two mixing elements comprise a first mixing element and a second element separated from said first mixing element.

20. The fluid radiation treatment system defined in claim 19, wherein the first mixing element and the second mixing element are substantially mirror images of one another.

21. The fluid radiation treatment system defined in claim 19, wherein the first mixing element and the second mixing element are substantially non-mirror images of one another.

22. The fluid radiation treatment system defined in claim 19, wherein the first mixing element comprises a first leading edge and a first trailing edge.

23. The fluid radiation treatment system defined in claim 19, wherein the first mixing element comprises a first leading edge and a first trailing edge, and the second mixing element comprises a second leading edge and a second trailing edge.

24. The fluid radiation treatment system defined in claim 23, wherein at least one of the first leading edge and the second leading edge comprises a substantially straight edge.

25. The fluid radiation treatment system defined in claim 23, wherein both of the first leading edge and the second leading edge comprise a substantially straight edge.

26. The fluid radiation treatment system defined in claim 23, wherein at least one of the first leading edge and the second leading edge comprises a substantially curved edge.

27. The fluid radiation treatment system defined in claim 23, wherein both of the first leading edge and the second leading edge comprise a substantially curved edge.

28. The fluid radiation treatment system defined in claim 23, wherein the first trailing edge and the second trailing edge are integral such that the first mixing element and the second mixing element are interconnected.

29. The fluid radiation treatment system defined in claim 23, wherein the first trailing edge and the second trailing edge are in spaced relation to define an opening between the first mixing element and the second mixing element.

30. The fluid radiation treatment system defined in claim 23, wherein the first leading edge and the second leading edge are integral such that the first mixing element and the second mixing element are interconnected.

31. The fluid radiation treatment system defined in claim 19, wherein the first mixing element comprises a first apex portion.

32. The fluid radiation treatment system defined in claim 31, wherein the first apex portion is oriented substantially downstream with respect to the direction of fluid flow.

33. The fluid radiation treatment system defined in claim 31, wherein the first apex portion is oriented substantially upstream with respect to the direction of fluid flow.

34. The fluid radiation treatment system defined in claim 19, wherein the first mixing element comprises a first apex portion and the second mixing element comprises a second apex portion.

35. The fluid radiation treatment system defined in claim 34, wherein the first apex portion and the second apex portion are oriented substantially downstream with respect to the direction of fluid flow.

36. The fluid radiation treatment system defined in claim 1, wherein the first apex portion and the second apex portion are oriented substantially upstream with respect to the direction of fluid flow.

37. The fluid radiation treatment system defined in claim 1, wherein the at least one mixing element comprises a plane.

38. The fluid radiation treatment system defined in claim 1, wherein the at least one mixing element comprises a wedge.

39. The fluid radiation treatment system defined in claim 1, further comprising a radiation source module coupled to said surface.

* * * * *